COMMON MODE CHOKE FOR TWO-DIMENSIONAL MEMORY ARRAY

Filed June 9, 1967 2 Sheets-Sheet 1

INVENTOR
GORDON R. LANE
BY Thomas J. Nikolai
ATTORNEY

Sept. 30, 1969 G. R. LANE 3,470,549

COMMON MODE CHOKE FOR TWO-DIMENSIONAL MEMORY ARRAY

Filed June 9, 1967 2 Sheets-Sheet 2

INVENTOR
GORDON R. LANE
BY Thomas J. Nikolai
ATTORNEY 3,470,549
COMMON MODE CHOKE FOR TWO-DIMENSIONAL MEMORY ARRAY Gordon R. Lane, White Bear Lake, Minn., assignor to Sperry Rand Corporation, New York, N.Y., a corporation of Delaware Filed June 9, 1967, Ser. No. 645,004
Int. Cl. G11c *5/08, 11/06*
U.S. Cl. 340—174 10 Claims

ABSTRACT OF THE DISCLOSURE

An apparatus for and a method of providing current balancing and common mode current signal rejection in the word line selection circuitry of a two-dimensional memory system. The wire coupling the one selected word line driver and the one selected word line diverter form the input wire of a two-wire, twisted-pair, transmission line, the other wire, or output wire, being formed by a ground return wire. Groups of word line driver ends and groups of word line diverter ends of the so-formed two-wire transmission lines are coupled to separately associated high permeability cores for forming common mode chokes. Electrically intermediate the common mode chokes is a non-ground level terminating strip that functions as a common signal return path for the driver and diverter currents.

Background of the invention

The present invention is considered to be an improvement invention over that disclosed in the copending application of R. D. Rothenberger et. al., Ser. No. 597,029 filed Nov. 25, 1966 and assigned to the Sperry Rand Corporation as is the present invention. The R. D. Rothenberger et al. application is particularly directed toward a conventional coincident-current (bit-organized) memory system consisting of a plurality of two-dimensional arrays of ferrite cores with said plurality of said two-dimensional arrays packaged in a stacked, superposed arrangement forming a three-dimensional "memory stack." This three-dimensional arrangement of a plurality of two-dimensional arrays permits the efficient cabling of all the input lines and return, or output, lines of a single selection axis into a single cable that may be coupled to a single high permeability core for forming a common mode choke therewith.

In a two-dimensional packaging arrangement such arrangement is inefficient in that input line and output line lead lengths become excessively long whereby capacitive and inductive coupling of such leads induce undesirable noise signals into the selection system and thence into the sensing, or readout, system. Reference to FIG. 1 of the R. D. Rothenberger et al. application illustrates the excessive lead lengths required with the illustrated eight two-dimensional arrays when arranged in a two-dimensional arrangement rather than in the three-dimensional arrangement normally utilized with coincident-current, or bit-organized, memory systems to which the R. D. Rothenberger et al. application is particularly directed.

Summary of the invention

In contrast to the three-dimensional array of a plurality of stacked, superposed two-dimensional arrays of memory elements forming a bit-organized memory system to which the R. D. Rothenberger et al. patent application is particularly directed the present invention is particularly directed toward a two-dimensional array of memory elements of a word-organized memory system. The preferred embodiment of the present invention is particularly directed toward a plated-wire memory system packaging arrangement such as disclosed in the copending application of L. J. Michaud et al., Ser. No. 644,861, filed June 9, 1967, assigned to the Sperry Rand Corporation as is the present invention. In this copending L. J. Michaud et al. application there is illustrated a plurality of parallel-arranged, coplanar, plated-wire memory elements orthogonal to which are oriented a plurality of parallel, word straps, or word lines. Each word strap is inductively coupled to a unique area on each of the associated plated-wire memory elements. These unique areas correspond to bits of digital information thereby providing a multi-bit word having as many bits as there are associated plated-wire memory elements. These word straps pass over and return under the associated plurality of plated-wire memory elements entering and exiting the two-dimensional array on the same side thereof.

This packaging arrangement, in contrast to that of the R. D. Rothenberger et al. arrangement, permits an efficient utilization of a plurality of common mode chokes that are associated with groups of word line driver ends and groups of word line diverter ends of the associated double-ended memory selection system. The line coupling the one selected word line driver and the one selected word line diverter form the input wire of a two-wire, twisted-pair, transmission line, the other wire, or output wire, being formed by a ground return line. Groups of word line driver ends and groups of word line diverter ends of the so-formed two-wire transmission lines are coupled to separately associated high permeability cores for forming common mode chokes. By utilizing a terminating strip oriented orthogonal to the parallel arranged word lines these groups of word line driver ends and groups of word line diverter ends of the so-formed two-wire transmission lines may be formed along the length of the two-dimensional array providing minimum input line and output line lead lengths that couple the word line selection system to the two-dimensional plated-wire memory array. Accordingly, it is a primary object of the present invention to provide an improved method of coupling a memory selection system to a two-dimensional array of memory elements whereby input line and output line lead lengths therebetween are reduced to a minimum while providing current balancing and common mode current signal rejection in the selection circuitry.

Description of the preferred embodiments

Figure 1:
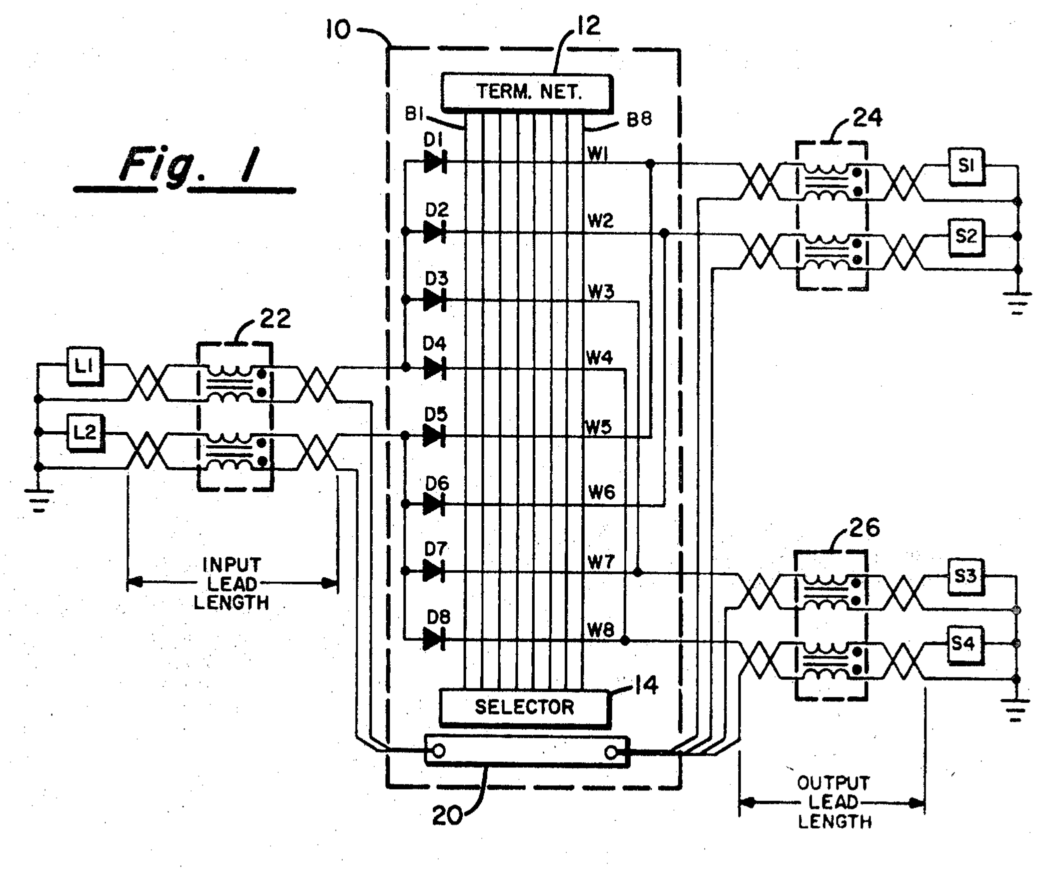
FIG. 1 is a circuit schematic of the preferred embodiment of the present invention.

With particular reference to FIG. 1 there is illustrated a circuit schematic of the preferred embodiment of the present invention which includes a diagrammatic illustration of a two-dimensional array of a plurality of plated-wire memory elements such as disclosed in the above referenced L. J. Michaud et al. application. In the illustrated embodiment two-dimensional array 10 of eight plated-wire memory elements B1 through B8 and eight word lines W1 through W8 provide a memory system of eight words each of eight bits in length with the bits of each word oriented along the associated word line, each bit being associated with a different memory element B1 through B8. Array 10 includes a terminating network 12 and a selector 14 including the amplifier-gates and bit drivers for each of the memory elements B1 through B8. Additionally, associated with each word line there are provided eight word line isolation diodes D1 through D8 for providing word line isolation. The double-ended selection system associated with array 10 includes word drivers L1 and L2 and diverters S1 through S4 at opposite electrical ends of the associated word lines. In a well-known manner, each of the word drivers L1 and L2 is coupled to four word different lines forming two groups of word lines while each of diverters S1 through S4 is coupled to two different word lines forming four groups of diverter lines. The arrangement is such that the enabling or selection, of one word driver and one diverter couples the appropriate drive current signal to the one uniquely associated word line. As an example, the concurrent enabling of word driver L2 and of diverter S4 selects word line W8 which, in the read operation, inductively couples a magnetic field to the associated areas of plated-wire memory elements B1 through B8 inducing a signal in the central conductor therein, which signal is representative of the informal state of the affected magnetizable area. The resulting readout signals are coupled to selector 14 which produces, as an output, eight signals in parallel that are representative of the informational state of the magnetizable areas associated with word line W8 and memory elements B1 through B8.

Each word driver L1, L2 is coupled to each of the diverters S1–S4 by a line, including the associated word line W1–W8, that forms the input wire of a two-wire transmission line. The other wire of each two-wire transmission line is formed of a ground return line, a first portion of which is associated with each driver L1, L2 and a second portion of which is associated with each diverter S1–S4; both portions of all two-wire transmission lines of which are coupled to a terminating strip 20 that is electrically intermediate the word drivers and the diverters. The first portion of each ground return line and the associated portion of the input line then couples the associated word driver to the associated word lines forming an input lead that is coupled to an associated high permeability core for forming a common mode choke therewith. In like manner the second portion of each ground return line and the associated portion of the input line that couples the associated diverter to the associated word line form an output lead that is coupled to an associated high permeability core for forming a common mode choke therewith. These input leads and output leads are twisted-pair two-wire transmission lines coupled to the associated core; the input leads being coupled to core 22 while the two groups of output leads are coupled to the associated cores 24 and 26. The object of the present invention is to provide an arrangement whereby these input leads and output leads are of a minimum length so as to effect memory operation efficiency.

Figure 2:
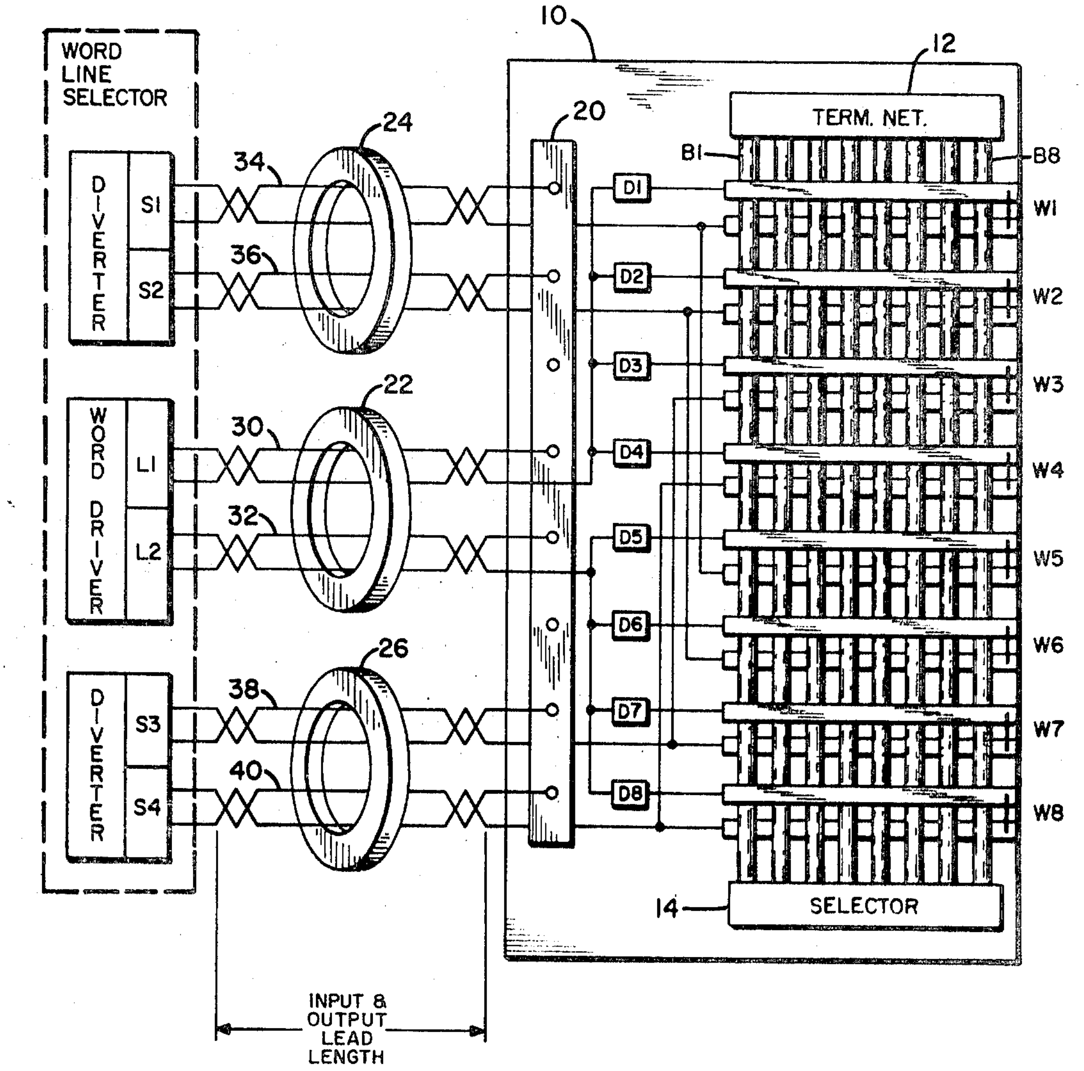
FIG. 2 is a diagrammatic illustration of the packaging scheme proposed by the present invention.

With particular reference to FIG. 2 there is presented a diagrammatic illustration of a memory system incorporating the inventive concept of the present invention. In this diagrammatic illustration of the preferred embodiment there is illustrated the two-dimensional array 10 such as previously discussed with respect to FIG. 1. This arrangement includes eight plated-wire memory elements B1 through B8 terminating at network 12 and selector 14, which plated-wire memory elements B1–B8 are inductively coupled to eight word lines W1 through W8 having their open ends at the left-hand side of the two-dimensional array 10 and their closed or intercoupled ends at the right-hand side of two-dimensional array 10 in the manner as disclosed in the above discussed L. Michaud et al. application, it being understood that the top and bottom portions of each word line are arranged in a stacked, superposed configuration. In the illustrated arrangement the upper portion of each word line at its open end is coupled to the associated word line isolation diode while the lower portion of each word line is at its open end coupled to the associated diverter or word driver through the respectively associated input and output leads and the associated conductive terminating strip 20. Terminating strip 20 runs along the left-hand edge of the two-dimensional array 10 having its longitudinal axis parallel to the plated-wire memory elements B1–B8 and orthogonal to the longitudinal axes of the word lines W1–W8. As described with respect to FIG. 1 each word driver L1, L2 is coupled to each of the diverters S1, S2, S3, and S4 by a line, including the associated word line W1–W8, that forms the input wire of a two-wire transmission line. The other wire of each two-wire transmission line is formed of a ground return line a first portion of which is associated with each driver L1, L2 and a second portion of which is associated with each diverter S1–S4; both portions of all two-wire transmission lines of which are coupled to "floating" or non-grounded terminating strip 20 that is electrically intermediate the word drivers and the diverters. The first portion of each ground return line and the associated portion of the input line that couples the associated word driver to the associated word lines and to the terminating strip form an input lead that is coupled to an associated high permeability core 22 for forming a common mode choke therewith. In like manner the second portion of each ground return line and the associated portion of the input line that couples the associated diverter to the associated word lines and to the terminating strip form an output lead that is coupled to an associated high permeability core 24, 26 for forming a common mode choke therewith. These input leads and output leads are twisted-pair two-wire transmission lines; input leads 30, 32 being coupled to core 22, output leads 34 and 36 being coupled to core 24 and output leads 38 and 40 being coupled to core 26. Additionally, input leads 30 and 32 are coupled to word drivers L1 and L2, respectively, forming a first group of input leads while output lines 34 and 36 are coupled to diverters S1 and S2, respectively, forming a first group of output leads and output leads 38 and 40 are coupled to diverters S3 and S4, respectively, forming a second group of output leads. This arrangement provides minimum input lead lengths and output lead lengths so as to effect optimum memory operation efficiency.

The efficacy of the present invention concerns the use of the terminating strip 20 which functions as a low capacitive, low induction line that is a common current signal return path for all word line drive currents. By the use of this common return path there is provided an electrical path that is substantially shorter than that provided by prior art methods. As the preferred embodiment relates to a high-speed plated-wire memory system (having a 400 (ns.) nanosecond write time and a 250 nanosecond read time) it is essential the selection electronics provide read and write current pulses of short rise and fall times to the memory elements. By providing a packaging scheme that permits minimum input and output lead lengths and, accordingly, minimum deleterious capacitive and inductive effects, the read and write current pulses, as inductively coupled by the word lines to the plated-wire memory elements, may have maximum rise and fall times in the order of 40 nanoseconds with an 80 nanosecond wide pulse. As the output signal amplitude is a function of the drive current pulse rise and fall time it can be seen that the short rise and fall times provided by the present invention provide larger output signal amplitudes with smaller input signal amplitudes while, additionally, providing reduced noise signals due to the inherent current balancing and common mode current signal rejection.

Figure 3:
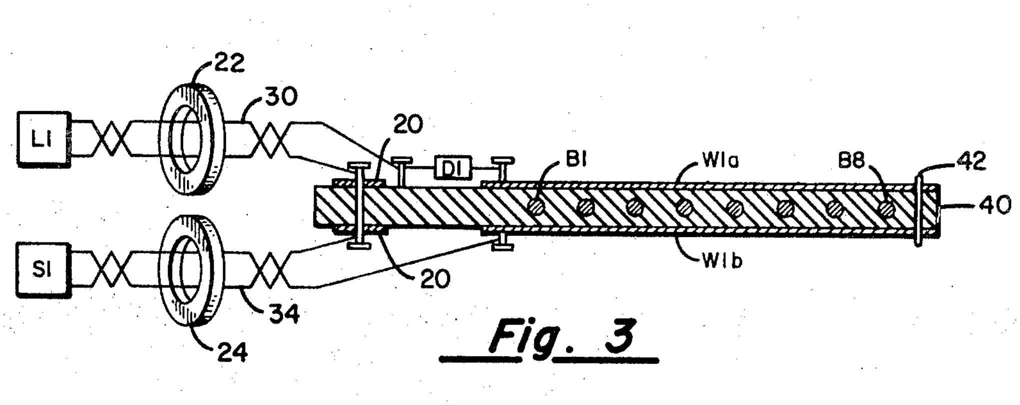
FIG. 3 is a diagrammatic illustration of a cross section of the arrangement of FIG. 2.

With particular reference to FIG. 2 there is presented a diagrammatic illustration of a cross-section of the illustrated embodiment of FIG. 2 taken normal to the plated-wire memory elements B1–B8. In this illustration there is schematically illustrated a base member 40 through which pass the plurality of plated-wire memory elements B1–B8. The word lines, such as word line W7, consist of a top portion W1*a* and a bottom portion W1*b* electrically intercoupled at the right-hand end by a conductive member 42. Word driver L1 is coupled to the two-dimensional array 10 by means of input lead 34 to terminating strip 20 and to the open end of portion W1*b* of word line W1 while diverters S1 is coupled to the two-dimensional array 10 by means of output lead 30 to terminating strip 20 and to the open end of portion W1*a* of word line W1 by means of diode D1. It is to be understood that the details of FIG. 3 are illustrative only while the particular details of two-dimensional array 10 may be more in accordance with the teaching of the copending application of L. J. Michaud et al.

Thus it is apparent that there has been described and illustrated herein a preferred embodiment of the present invention that provides an improved method of achieving current balancing and common mode rejection of current signals in the drive lines of a two-dimensional array of plated-wire memory elements. It is understood that suitable modifications may be made in the structure as disclosed provided that such modifications come within the spirit and scope of the appended claims. Having, now, fully illustrated and described my invention, what I claim to be new and desire to protect by Letters Patent is set forth in the appended claims.

I claim:

1. An apparatus for providing current balancing and common mode current rejection in the selection circuitry of a two-dimensional memory system, comprising:

a plurality of drive lines each drive line having first and second ends;
a conductive terminating strip;
a word driver;
a plurality of diverters;
a plurality of high permeability cores;
first input means coupling said word driver to said terminating strip and to the first ends of a first plurality of said word lines;
said first input means coupled to a first of said cores for forming a common mode choke therewith;
first output means coupling a first of said diverters to said terminating strip and to the second ends of a second plurality of said word lines;
second output means coupling a second of said diverters to said terminating strip and to the second ends of a third plurality of said word lines; and,
said first and second output means coupled to a second of said core for forming a common mode choke therewith;
said terminating strip forming a non-ground common signal return path for said word driver and said diverters.

2. An apparatus for providing current balancing and common mode current rejection in the selection circuitry of a two-dimensional memory system, comprising:

a plurality of drive lines each drive line having first and second ends;
a conductive terminating strip;
a plurality of word drivers;
a plurality of diverters;
a plurality of high permeability cores;
first input means coupling a first of said word drivers to said terminating strip and to the first ends of a first plurality of said word lines;
second input means coupling a second of said word drivers to said terminating strip and to the first ends of a second plurality of said word lines;
said first and second input means coupled to a first of said cores for forming a common mode choke therewith;
first output means coupling a first of said diverters to said terminating strip and to the second ends of a third plurality of said word lines;
second output means coupling a second of said diverters to said terminating strip and to the second ends of a fourth plurality of said word lines;
third output means coupling a third of said diverters to said terminating strip and to the second ends of a fifth plurality of said word lines;
fourth output means coupling a fourth of said diverters to said terminating strip and to the second ends of a sixth plurality of said word lines;
said first and second output means coupled to a second of said cores for forming a common mode choke therewith; and,
said third and fourth output means coupled to a third of said cores for forming a common mode choke therewith.

3. The apparatus of claim 2 further including a plurality of word line isolation diodes, a separate one associated with each of said word lines.

4. The apparatus of claim 3 wherein said first and second input means and said first, second, third, and fourth output means are each two-wire, twisted pair transmission lines.

5. The apparatus of claim 4 wherein said first and second input means each couple the associated word driver across said terminating strip and the first end of the associated word line.

6. The apparatus of claim 5 wherein said first, second, third, and fourth output means each couple the associated diverter across said terminating strip and the second end of the associated word line.

7. The apparatus of claim 6 wherein said terminating strip forms a non-ground common signal return path for said word drivers and said diverters.

8. The apparatus of claim 7 wherein said word lines are each formed of top and bottom portions that pass over and under, respectively, a plurality of inductively coupled magnetizable memory elements and wherein said top and bottom portions are electrically intercoupled at a closed end forming said first and second ends at the opposite open end thereof.

9. The apparatus of claim 8 wherein said terminating strip is arranged orthogonal to said word lines at the open ends thereof.

10. The apparatus of claim 9 wherein said first and second plurality of word lines each include a separate word line, each of said two separate word lines included in said third plurality of word lines.

References Cited

UNITED STATES PATENTS

| | | | |
|---|---|---|---|
| 3,015,809 | 1/1962 | Myers | 340—174 |
| 3,122,724 | 2/1964 | Felton et al. | 340—174 |
| 3,192,510 | 6/1965 | Flaherty | 340—174 |
| 3,214,742 | 10/1965 | Bobeck | 340—174 |
| 3,283,311 | 11/1966 | Guttroff | 340—174 |

OTHER REFERENCES

IBM Technical Disclosure Bulletin, "Current Summing Arrangement for Magnetic Core Memory," by Foglia, vol. 9, No. 4, September 1966, pages 400–401, copy in 340–174 M.

STANLEY M. URYNOWICZ, Jr., Primary Examiner